(12) United States Patent
Teply

(10) Patent No.: US 11,387,679 B2
(45) Date of Patent: Jul. 12, 2022

(54) ENCLOSURE WIRELESS CHARGING

(71) Applicant: STMicroelectronics Design and Application S.R.O., Prague (CZ)

(72) Inventor: Tomas Teply, Prague-Hloubetín (CZ)

(73) Assignee: STMicroelectronics Design and Application S.R.O., Prague (CZ)

( * ) Notice: Subject to any disclaimer, the term of this patent is extended or adjusted under 35 U.S.C. 154(b) by 43 days.

(21) Appl. No.: 17/008,238

(22) Filed: Aug. 31, 2020

(65) Prior Publication Data

US 2022/0069626 A1    Mar. 3, 2022

(51) Int. Cl.
| | |
|---|---|
| *H01M 10/44* | (2006.01) |
| *H01M 10/46* | (2006.01) |
| *H02J 50/12* | (2016.01) |
| *H02J 7/02* | (2016.01) |
| *H02J 50/70* | (2016.01) |
| *H02J 50/80* | (2016.01) |
| *H02J 50/00* | (2016.01) |
| *H01F 38/14* | (2006.01) |
| *H01F 27/36* | (2006.01) |
| *H02J 50/40* | (2016.01) |
| *H04R 1/10* | (2006.01) |
| *H01F 27/28* | (2006.01) |

(52) U.S. Cl.
CPC .......... *H02J 50/12* (2016.02); *H01F 27/2885* (2013.01); *H01F 27/36* (2013.01); *H01F 38/14* (2013.01); *H02J 7/02* (2013.01); *H02J 50/005* (2020.01); *H02J 50/40* (2016.02); *H02J 50/70* (2016.02); *H02J 50/80* (2016.02); *H04R 1/1016* (2013.01); *H04R 1/1025* (2013.01); *H04R 1/1041* (2013.01); *H04R 1/1058* (2013.01); *H04R 2420/07* (2013.01)

(58) Field of Classification Search
CPC .. H02J 7/02; H02J 7/0042; H02J 50/12; H02J 50/005; H02J 50/80; H02J 50/40; H02J 50/70; H04R 1/1016; H04R 1/1041; H01F 27/36
USPC .............................. 320/107, 108, 114, 115
See application file for complete search history.

(56) References Cited

U.S. PATENT DOCUMENTS

| | | |
|---|---|---|
| 9,949,015 B1 | 4/2018 | Minoo et al. |
| 9,967,648 B2 | 5/2018 | Panecki et al. |
| 10,085,083 B2 | 9/2018 | Minoo et al. |
| 10,264,343 B2 | 4/2019 | Ingram |
| 10,681,446 B2 | 6/2020 | Chawan et al. |
| 2010/0320961 A1 | 12/2010 | Castillo et al. |
| 2015/0245125 A1 | 8/2015 | Shaffer |
| 2015/0245126 A1 | 8/2015 | Shaffer |
| 2015/0373448 A1 | 12/2015 | Shaffer |
| 2017/0231345 A1 | 8/2017 | Gronewoller et al. |

(Continued)

FOREIGN PATENT DOCUMENTS

| | | | |
|---|---|---|---|
| CN | 105393427 A * | 3/2016 | ............. H02J 50/12 |
| DK | 201970049 A1 | 2/2019 | |

*Primary Examiner* — Edward Tso
(74) *Attorney, Agent, or Firm* — Slater Matsil, LLP

(57) ABSTRACT

A system and method for wireless charging a wireless earbud. The wireless earbud having a body that includes a passive magnetic shield and a coil. The coil is wound around a portion of the body comprising the passive magnetic shielding. The wireless earbud receiving wireless energy in response to the placement of the body within an electromagnetic field, which results in the charging of a battery of the wireless earbud.

20 Claims, 7 Drawing Sheets

(56) References Cited

U.S. PATENT DOCUMENTS

2018/0014104 A1\* 1/2018 Boesen ............... H04R 1/1016
2018/0014436 A1   1/2018 Milevski
2018/0091887 A1   3/2018 Minoo et al.
2019/0305591 A1\* 10/2019 Ng ......................... H02J 50/40

\* cited by examiner

ENCLOSURE WIRELESS CHARGING

TECHNICAL FIELD

The present disclosure generally relates to wireless charging, and, in particular embodiments, to a system and method for wireless charging in a wireless power system.

BACKGROUND

Wireless technology can be found in a variety of devices, such as activity trackers, smart rings, watches, toothbrushes, remote controls, and mobile devices. Further, previously wired devices, such as vacuums, game controllers, and headphones, have been modernized to take advantage of the benefits of wireless technology. For example, the removal of the 3.5 mm headphone jack from cell phones has given way to the widespread adoption of wireless earbuds.

For operation, a wireless earbud includes battery storage that can be charged using a charging device. Generally, the charging device is an enclosure that houses the earbuds and connects with the earbuds using physical interconnect pads. The physical interconnect pads prevent the earbuds from being truly wireless, leading to possible damage by the elements and corrosion. An alternative system and method for charging a device using an enclosure are desired.

SUMMARY

A first aspect relates to a method of operating a wireless charging system; the method includes having a wireless earbud, which includes a body. The body includes a passive magnetic shielding and a coil. The coil is wound around a portion of the body that includes the passive magnetic shielding. The method further includes (1) receiving, by the coil, wireless energy in response to a placement of the body within an electromagnetic field, and (2) charging a battery of the wireless earbud in response to receiving the wireless energy.

In the first implementation form of the method according to the first aspect, the electromagnetic field is present within an enclosure having a gap within a magnetic shield portion of the enclosure—the receiving of the wireless energy is in accordance with a placement of the body of the wireless earbud within the gap.

In a second implementation form of the method, according to the first aspect as such or any preceding implementation of the first aspect, the electromagnetic field is generated by a circuit of the enclosure.

In a third implementation form of the method, according to the first aspect as such or any preceding implementation of the first aspect, the electromagnetic field is generated by a second device that simultaneously provides wireless energy to the enclosure and the wireless earbud.

In a fourth implementation form of the method, according to the first aspect as such or any preceding implementation of the first aspect, the method further includes generating a near field communication with the enclosure—the near field communication providing a signal to the enclosure indicating the placement of the body of the wireless earbud within the gap.

In a fifth implementation form of the method, according to the first aspect as such or any preceding implementation of the first aspect, the method further includes detecting, by the wireless earbud, an absence of the electromagnetic field and communicating a request for wireless energy from the enclosure.

In a sixth implementation form of the method, according to the first aspect as such or any preceding implementation of the first aspect, the detecting includes determining whether a voltage at an output of a rectifier of the wireless earbud is within a threshold, and, based thereon, requesting the wireless energy from the enclosure.

A second aspect relates to a wireless earbud, which includes a body, a coil, and a circuit. The body is configured to shield electromagnetic fields. The coil is wound around the body. The circuit is configured to receive a signal from an external source—the signal used to generate audio. The circuit is powered by a battery coupled to the coil. The battery is configured to wirelessly charge in accordance with a placement of the body of the wireless earbud within an electromagnetic field.

In a first implementation form of the wireless earbud according to the second aspect as such, the electromagnetic field is provided within an enclosure having a gap within a portion of the enclosure having a magnetic shield—the wireless charging of the battery in accordance with the placement of the body of the wireless earbud within the gap.

In a second implementation form of the wireless earbud, according to the second aspect as such or any preceding implementation of the second aspect, the electromagnetic field is generated by a circuit of the enclosure.

In a third implementation form of the wireless earbud, according to the second aspect as such or any preceding implementation of the second aspect, the electromagnetic field is generated by a second device that simultaneously provides wireless energy to the enclosure and the wireless earbud.

In a fourth implementation form of the wireless earbud, according to the second aspect as such or any preceding implementation of the second aspect, the device further includes a second circuit. The second circuit includes a non-transitory memory storage and a processor. The non-transitory memory storage includes instructions. The processor is in communication with the non-transitory memory storage. The processor executes instructions to generate a near field communication with the enclosure—the near field communication providing a signal to the enclosure indicating the placement of the body of the wireless earbud within the gap.

In a fifth implementation form of the wireless earbud, according to the second aspect as such or any preceding implementation of the second aspect, the second circuit further includes a switch diode type rectifier.

A third aspect relates to a wireless power system that includes an enclosure and a receiving device. The enclosure includes a housing and a first circuit. The housing includes a receptacle for holding the receiving device and a plate that includes a gap. The plate is configured to shield electromagnetic fields. The first circuit is configured to receive wireless energy in a first mode corresponding to a first electromagnetic field generated by an external device and transmit wireless energy in a second mode corresponding to a second electromagnetic field generated by the first circuit. The receiving device includes a body, a coil, and a second circuit. The body is configured to shield electromagnetic fields. The coil surrounds the body. The second circuit is configured to receive wireless energy in accordance with the first electromagnetic field and the second electromagnetic field—the receiving in response to placement of the receiving device in the gap of the plate.

In a first implementation form of the wireless power system according to the third aspect, the enclosure housing further includes a resonant reactive current shielding. The resonant reactive current shielding includes a shield coil configured to reduce electromagnetic leakage from the enclosure housing.

In a second implementation form of the wireless power system, according to the third aspect as such or any preceding implementation of the third aspect, the enclosure housing further includes an active shielding. The active shielding includes a shield coil and a power source coupled to the shield coil. The power source is configured to be enabled in the second mode of the first circuit and disabled in the first mode of the first circuit-enabling of the active shielding reducing electromagnetic leakage from the enclosure housing.

In a third implementation form of the wireless power system, according to the third aspect as such or any preceding implementation of the third aspect, the first circuit further includes a non-transitory memory storage and a processor. The non-transitory memory storage includes instructions. The processor is in communication with the non-transitory memory storage. The processor executes the instructions to detect an absence of the first electromagnetic field, detect the placement of the receiving device in the gap of the plate, and generate the second electromagnetic field.

In a fourth implementation form of the wireless power system, according to the third aspect as such or any preceding implementation of the third aspect, the first circuit further includes a rectifier electrically coupled to a second coil. The detecting an absence of the first electromagnetic field includes determining whether a voltage at an output of the rectifier is within a threshold, and, based thereon, detecting a status of the first electromagnetic field.

In a fifth implementation form of the wireless power system, according to the third aspect as such or any preceding implementation of the third aspect, the detecting the placement of the receiving device in the gap of the plate includes receiving a signal from the receiving device—the signal indicating a request for wireless energy.

In a sixth implementation form of the wireless power system, according to the third aspect as such or any preceding implementation of the third aspect, the enclosure, the receiving device, and the external device are in communication with each other using near field communication.

Embodiments can be implemented in hardware, software, or in any combination thereof.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

Figure 1:
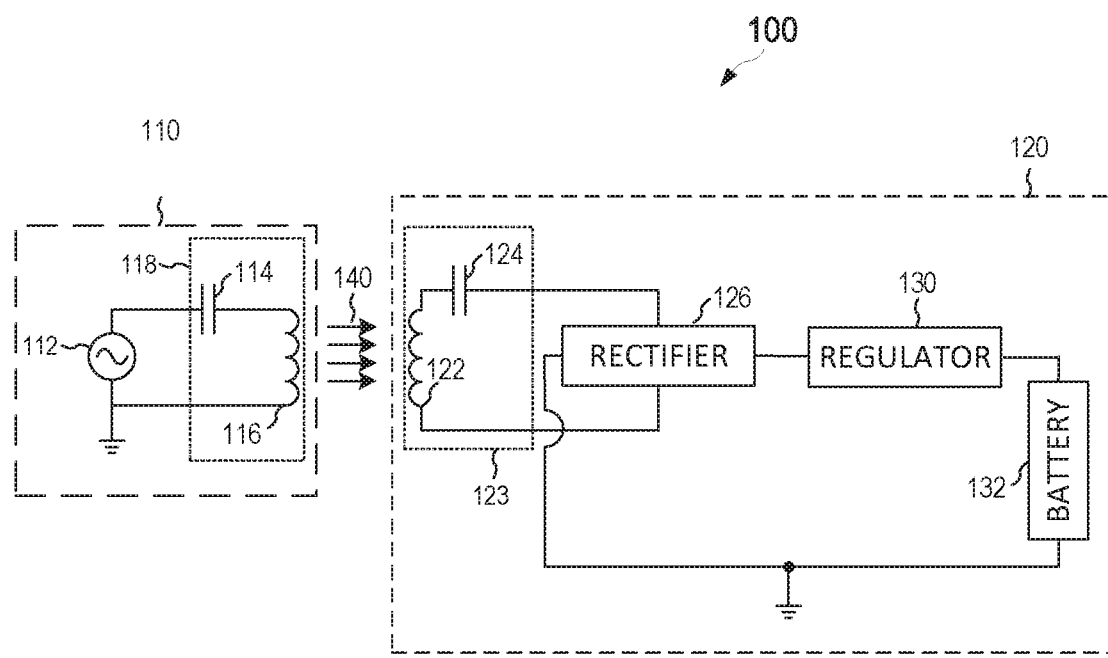
FIG. 1 is a schematic diagram of a wireless power system.

This disclosure provides many applicable inventive concepts that can be embodied in a wide variety of specific contexts. The specific embodiments are merely illustrative of specific configurations and do not limit the scope of the claimed embodiments. Features from different embodiments may be combined to form further embodiments unless noted otherwise. Variations or modifications described to one of the embodiments may also apply to other embodiments. Further, it should be understood that various changes, substitutions, and alterations can be made herein without departing from the spirit and scope of this disclosure as defined by the appended claims.

While the inventive aspects are described primarily in the context of charging wearable electronics operating in low-power conditions (e.g., wireless earbuds in an enclosure), it should also be appreciated that these inventive aspects may also be applicable to any other type of wireless charging system having a device capable of operating in both transmit and receive modes and working at various power levels.

Wireless earbuds include a battery that enables the wireless operation of the device. As the battery has a limited charging capacity, the user must charge the battery in between uses. Manufacturers have provided different solutions for the charging, such as direct charging or using an intermediary device. The use of an intermediary device has become more common as the intermediary device is designed as an enclosure that can be used to additionally provide a portable and damage-free means of transporting the wireless earbuds. Further, the wireless earbuds can be charged by a battery of the enclosure during the storage and transportation of the wireless earbuds. Such a design does not require the tethering of the wireless earbuds to a fixed location during charging.

The intermediary device (e.g., enclosure) may be charged using wireless charging such as inductive charging or (more commonly) using a wired connection, such as USB or USB-C. The wireless earbuds, in turn, are charged using a pad and interface contact between the wireless earbud and the enclosure. In other words, regardless of whether a battery of the enclosure is charged using wireless or wired energy transfer, the wireless earbuds are charged using a direct electrical contact interface between the enclosure and the wireless earbuds.

The electrical contact interface presents several disadvantages. First, the pads (i.e., interconnect interface) at the wireless earbuds are routinely exposed to the elements. Damage to the pads, either through mishandling or aging, may block or reduce the transfer of energy to the wireless earbuds. Second, the exposed interface prevents the earbuds from being a truly wireless experience. Replacing the exposed interface with a different means of charging within a sealed package provides advantages such as receiving an ingress protection (IP) rating and recognition that the wireless earbuds are resistive to dust and moisture, such as being able to withstand submersion in water.

Thus, a need exists for an improved system and method to overcome these limitations. Embodiments of this disclosure provide a system and method that provides an enclosure capable of wirelessly operating in transmit and receive modes. The various embodiments may be widely used to provide an enclosure allowing wireless power transfer from a transmitting device, simultaneously, to the enclosure and the device enclosed by the enclosure in a first mode of operation. Further, embodiments of this disclosure are capable of operating in a second mode where the enclosure is providing the wireless energy to the enclosed device while maintaining a safe environment and shielding other devices from the electromagnetic field generated by the enclosure in the second mode. In either operation mode, the enclosed device receives wireless energy via inductive charging.

Moreover, embodiments of this disclosure provide for a wireless power receiver circuit in a wireless earbud. The wireless earbuds may be charged via inductive coupling within an enclosure. In a first operating mode of the enclosure, an external device generates a magnetic field. The magnetic field induces a corresponding magnetic field at the enclosure, which is converted and stored as energy at a battery of the enclosure. The enclosure includes a magnetic shield having a gap. The gap provides for the magnetic field generated by the external device to induce a corresponding magnetic field at each wireless earbud positioned within the gap. In each device, the wireless energy is converted and stored as energy at a battery of each wireless earbud. In a second operating mode of the enclosure, the enclosure generates a magnetic field (without the external device) that induces a corresponding magnetic field at each wireless earbud placed within the gap, which is converted and stored as energy at the battery of each wireless earbud. These and other details are discussed in greater detail below.

FIG. 1 illustrates a schematic diagram of a wireless power system 100. The wireless power system 100 includes a transmitting device 110 and a reverse chargeable device 120. The transmitting device 110 wirelessly transfers power 140 to the reverse chargeable device 120—the reverse chargeable device 120 is operating in receive mode in FIG. 1. The power source 112 generates an alternating current (AC) at the transmit-coil 116, which induces a magnetic field at the coil 122. The induced magnetic field induces an AC voltage at the coil 122 through mutual coupling. The rectifier 126 converts the AC voltage to a DC voltage. The regulator 130 converts the DC voltage from the rectifier 126 to match a desired DC voltage at the battery 132.

The transmitting device 110 may be a base station, for example, a charging pad, which provides the inductive power to the reverse chargeable device 120. The transmitting device 110 includes a power source 112, optionally a supply-side capacitor 114, and a transmit-coil 116. The power source 112 is any device that generates an alternating current (AC) power supplied to the transmit-coil 116. In embodiments, the transmitting device 110 may include a DC-to-AC inverter to provide the AC power. The transmit-coil 116 may be a loop antenna or a magnetic antenna. The transmit-coil 116 may include a physical core (e.g., ferrite core) or an air core, and may be implemented as an antenna strip or using a Litz wire wound in a spiral shape. The optional supply-side capacitor 114 and the transmit-coil 116 combine to form a transmit LC tank circuit 118. The power source 112 drives the transmit LC tank circuit 118, which generates the electromagnetic field (EMF) at the transmit-coil 116.

The reverse chargeable device 120 may be an enclosure used to house and charge, for example, a pair of wireless earbuds. The reverse chargeable device 120 includes a coil 122, optionally a capacitor 124, a rectifier 126, a regulator 130, and a battery 132, which may (or may not) be arranged as shown in FIG. 1. The reverse chargeable device 120 may include additional components not depicted in FIG. 1, such as long-term storage (e.g., non-volatile memory, etc.), a non-transitory computer-readable medium, one or more antenna elements, drivers, demodulators, modulators, filter circuits, and impedance matching circuits.

The coil 122 may be similar in feature and structure to the transmit-coil 116 and may be arranged in series with the optional capacitor 124, which in combination form the LC tank circuit 123. Generally, the efficiency of the power transfer depends on the mutual coupling between the transmit coil-116 and coil 122. The mutual coupling is mainly determined by the diameter of each coil, the space between the coils, the permeability of the material between the coils, the inductance of the coils, the resonant frequency of each device, the operating frequency of the system, and the angle between the coils.

The rectifier 126 is a device that converts alternating current voltage to a direct current voltage. The rectifier 126 may be any rectifier well known in the art, for example, a passive rectifier or an active rectifier. The passive rectifier is typically the most common rectifier used in low power applications because of the simple design and passive operation of the design. In higher power applications, however, the diode drop provides poor efficiency, and other types of rectifiers, such as an active rectifier, may be used in its stead. In other embodiments, field-effect transistor (FETs) may be used in combination with diodes to benefit from better efficiency using active switching and to use a diode mode for the system start-up phase.

The regulator 130 is a device that maintains a constant output voltage for the battery 132. The regulator 130 receives an input voltage from the rectifier 126. The regulator 130 may be any type of voltage regulator, such as a linear regulator (e.g., low drop-out (LDO) linear regulator). In some embodiments, the rectifier 126 and regulator 130 may be part of a switched-mode power supply (SMPS) circuit. In other embodiments, the regulator 130 may be a step-up (boost) switching regulator.

The battery 132 receives the transferred power and may be used as a charge storage device to, for example, provide wireless energy to wireless earbuds enclosed within the reverse chargeable device 120.

Figure 2:
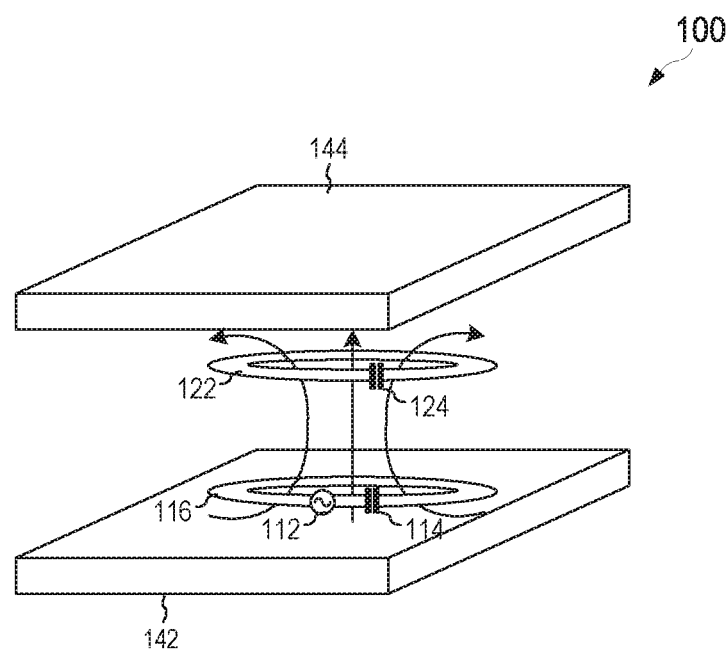
FIG. 2 is a representation of magnetic fields in the wireless power system.

FIG. 2 illustrates a representation of electromagnetic fields in the embodiment wireless power system 100 corresponding to the reverse chargeable device 120 operating in receive mode. To simplify the discussion and to minimize confusion, only the coil 122 and capacitor 124 of the reverse chargeable device 120 and only the transmit-coil 116, the capacitor 114, and the power source 112 of the transmitting device 110 of the wireless power system 100 are shown in FIG. 2.

As previously disclosed, the transmit-coil 116 and coil 122 are physically disconnected from each other. The power source 112 provides a flow of current through the transmit-coil 116, which generates a magnetic flux. In response to the magnetic flux, an induction voltage is generated at the coil 122. The magnetic flux only partially penetrates the coil 122, and the remainder is leaked around the wireless power system 100, which may cause interference with nearby electronic devices. A magnetic shield provides a low impedance path for the magnetic flux and reduces the leakage of the electromagnetic field around the wireless power system 100. Passive shielding is an effective method for limiting electromagnetic field leakage at low frequencies.

In an embodiment, the transmit-coil 116 and coil 122 are formed using a Litz wire that is tightly wound to form a spiral coil. The transmit-coil 116 and the coil 122 are separated by an air core or an air gap—the air gap acts as a magnetic core. The transmitting device 110 includes a first plate 142, and the reverse chargeable device 120 includes a second plate 144. The first plate 142 and the second plate 144 may be formed using conductive or ferromagnetic materials. In embodiments, the first plate 142 and the second plate 144 are integrated within an enclosure housing of, respectively, the transmitting device 110 and the reverse chargeable device 120. The two plates enclose the transmit-coil 116 and the coil 122 to block or attenuate magnetic field leakage. Further, system efficiency is improved as a result of minimizing the magnetic field leakage to the environment.

In embodiments, one or both of the first plate 142 and the second plate 144 are either a conductive or ferromagnetic material. In embodiments, the first plate 142 and the second plate 144 may include a conductive material layer and a non-conductive material layer. It is noted that additional plates may be placed at other angles and locations around the wireless power system 100 to mitigate leakage.

In embodiments, one or both of the first plate 142 and the second plate 144 is a material having high permeability, but low conductivity, such as a ferrite material. The ferrite material may alter the path of magnetic flux by guiding the magnetic flux through a preferred path of travel. The electromagnetic field thus traverses through the ferrite plate, with minimal leakage penetrating through the ferrite plate, and effectively limiting the exposure to the electromagnetic flux by external devices.

In embodiments, one or both of the first plate 142 and the second plate 144 is a conductive material, such as copper or aluminum. In such embodiments, the electromagnetic field induces eddy currents that circulate in the plate, which generate electromagnetic fields in the opposite direction from the reverse chargeable device 120 to the transmitting device 110—effectively canceling the magnetic flux originated from the transmit-coil 116.

Figure 3:
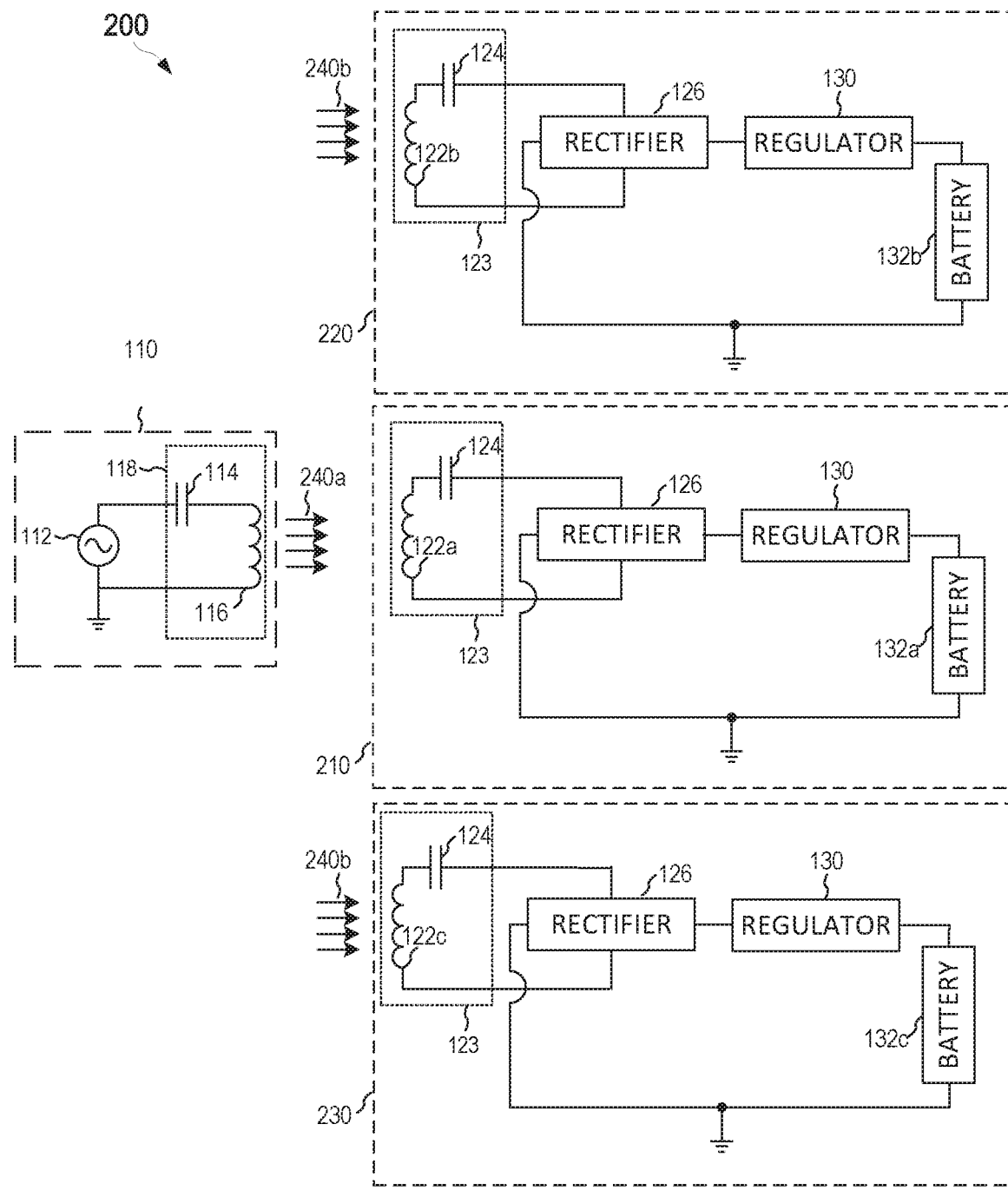
FIG. 3 is a schematic diagram of an embodiment wireless power system operating in a first mode.

FIG. 3 illustrates a schematic diagram of a wireless power system 200, when the reverse chargeable device 210 is operating in receive mode. The wireless power system 200 includes a transmitting device 110, a reverse chargeable device 210, a first receiving device 220, and a second receiving device 230. The transmitting device 110 wirelessly transfers power 240a to the reverse chargeable device 210. Additionally, the transmitting device 110 wireless transfers power 240b to the first receiving device 220 and the second receiving device 230. Thus, the wireless power system 200, similar to the wireless power system 100, provides a wireless power transfer from the transmitting device 110. However, in the wireless power system 200, the transmitting device 110 provides wireless power to three different devices simultaneously and acts as a common charger for all three devices.

The reverse chargeable device 210 includes an enclosure housing, which may have one or more receptacles for holding the first receiving device 220, the second receiving device 230, or both the first receiving device 220 and the second receiving device 230. In embodiments, the first receiving device 220 and the second receiving device 230, are wireless earbuds.

In embodiments, the first receiving device 220 and the second receiving device 230 are each a wireless earbud used to wirelessly listen to audio via, for example, a Bluetooth connection with a mobile device. The order of the first receiving device 220 and the second receiving device 230 is arbitrary, and each can be one of the left or right wireless earbuds in such an embodiment. The reverse chargeable device 210 is an enclosure that houses the wireless earbuds. Generally, the enclosure will have two receptacles for holding each wireless earbud; however, fewer or more receptacles are contemplated.

Generally, the electrical components and the operation of each of the components in each of the reverse chargeable device 210, the first receiving device 220, and the second receiving device 230, is similar to that previously discussed regarding the reverse chargeable device 120. Thus, for the sake of brevity, a repetition of previously discussed components is not reproduced.

One main difference between the reverse chargeable device 120 in FIG. 1 and the reverse chargeable device 210 in FIG. 3, however, is that the reverse chargeable device 210 is capable of operating in both transmit and receive modes. In receive mode, the reverse chargeable device 210, the first receiving device 220, and the second receiving device 230 receive wireless energy from the transmitting device 110. In transmit mode, the reverse chargeable device 210 transmits wireless energy to the first receiving device 220 and the second receiving device 230. Specifically, the reverse chargeable device 210 is capable of transmitting wireless power and receiving wireless power as further discussed regarding FIGS. 4A-C, 5, and 6A-B.

Figure 4A:
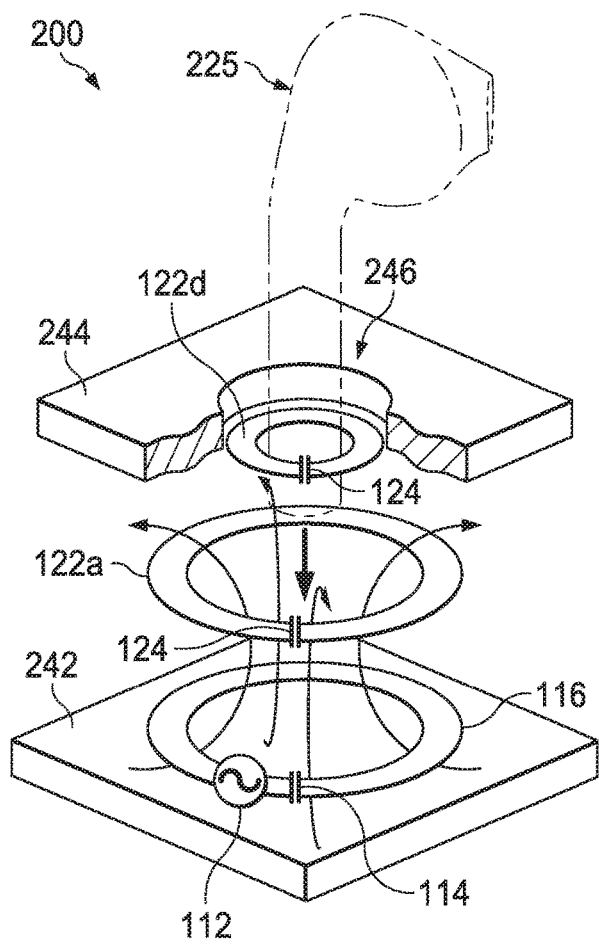
FIGS. 4A-B are graphical representations of electromagnetic fields in the second embodiment wireless power system operating in the first mode.
Figure 4B:
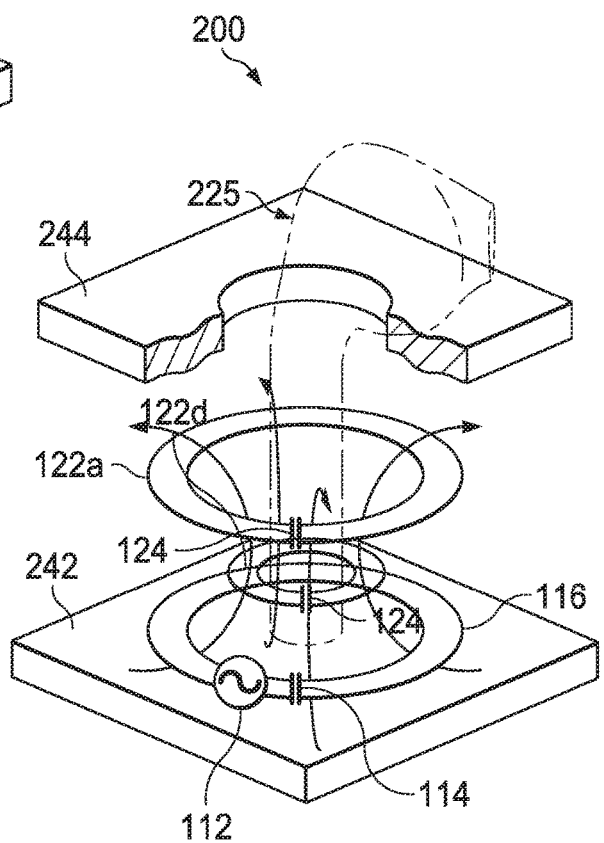

FIGS. 4A-B illustrate representations of magnetic fields in the embodiment wireless power system 200, corresponding to the reverse chargeable device 210 operating in receive mode. To simplify the discussion and to minimize confusion, only the coil 122a and capacitor 124 of the reverse chargeable device 210, the coil 122d and capacitor 124 of a receiving device 225, and only the transmit-coil 116, the capacitor 114, and the power source 112 of the transmitting device 110 are shown in FIGS. 4A-B.

FIG. 4A illustrates the positioning of the magnetic fields and various power circuits within the wireless power system 200 as the wireless earbud 225 is entering into the gap 246 within the second plate 244. FIG. 4B illustrates the positioning of the wireless earbud 225 in its final position in reference to the reverse chargeable device 210.

Figure 4C:
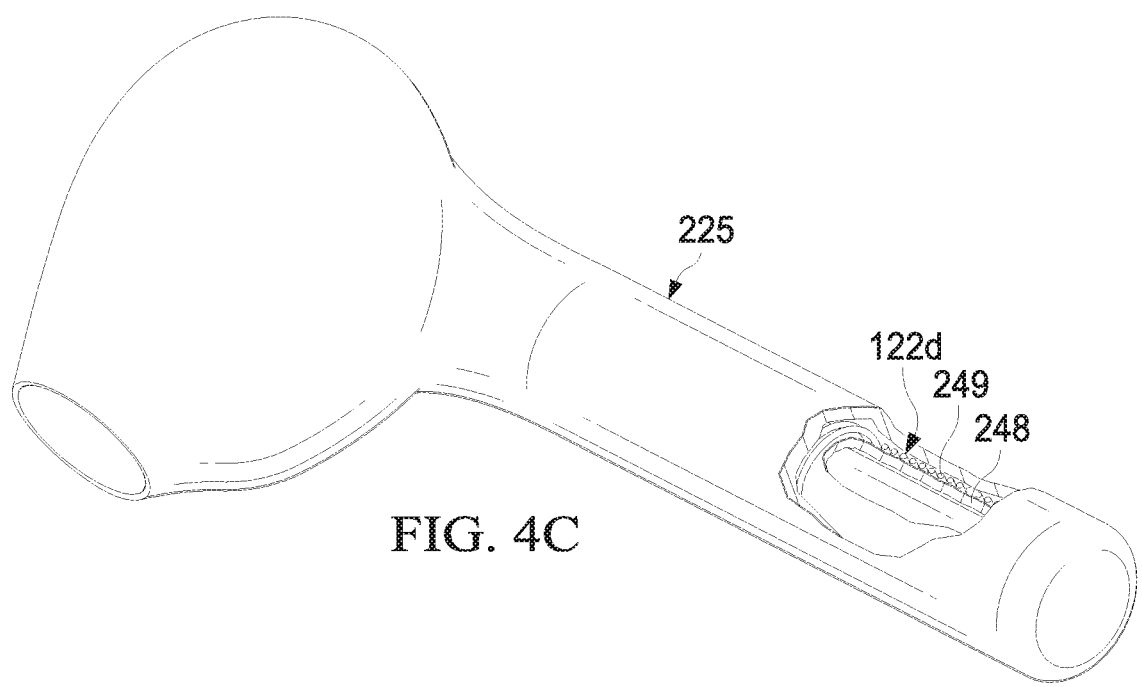
FIG. 4C is a representation of an embodiment wireless receiving device.

FIG. 4C illustrates a representation of an embodiment receiving device 225, which may represent the first receiving device 220, the second receiving device 230, or both the first receiving device 220 and the second receiving device 230. Similar to the reverse chargeable device 210, the receiving device 225 is operating in receive mode.

Unlike the second plate 144 in FIG. 2, the passive magnetic shielding of the second plate 244 in FIGS. 4A-B is broken to include one or more openings or gaps, which may act as a receptacle for the receiving device 225. As illustrated, the second plate 244 is shown to have a single gap 246 through which the receiving device 225 may be inserted. The illustration, however, is non-limiting and instances, where additional receiving devices are simultaneously inserted in the gap 246, are contemplated. Further, embodiments where the second plate 244 may have other openings or a receptacle for holding one or more receiving devices in each opening, are also contemplated.

It is noted that although the second plate 244 is shown to have a structure of a rectangular prism, it should be appreciated that the second plate 244 may have any conventional or unconventional shape formed around the body of the enclosure housing of the reverse chargeable device 210. Thus, the rectangular prism shape is non-limiting.

The receiving device 225 includes a body, which partially consists of a magnetic shielding 248. The magnetic shielding 248 may be a metallic portion of the body, which provides a passive magnetic shielding. The coil 122d is formed by winding a wire coil 249 around the magnetic shielding 248. The coil 122d may be a representation of the coil 122b of the first receiving device 220 and the coil 122c of the second receiving device 230.

Similar to FIG. 1, the power source 112 of the transmitting device 110 provides a flow of current through the transmit-coil 116, which generates a magnetic flux. In response to the magnetic flux, an induction voltage is generated at the coil 122a of the reverse chargeable device 120 and the coil 122d.

Additionally, the receiving device 225 (and in particular the magnetic shielding 248) is arranged in relation to the first plate 242 and the second plate 244, such that the magnetic field originating from the transmitting device 110 induces a voltage at a coil 122d of the receiving device 225.

In other words, the power source 112 generates an alternating current (AC), which induces a magnetic field at each of the coil 122a and 122d. The induced magnetic field at each coil 122a and 122d induces an AC voltage through mutual coupling. In each device (i.e., the reverse chargeable device 210 and the receiving device 225), the corresponding rectifier 126 converts the AC voltage to a DC voltage, and the corresponding regulator 130 converts the DC voltage from the rectifier 126 to match the desired DC voltage at the battery 132 of the device.

Figure 5:
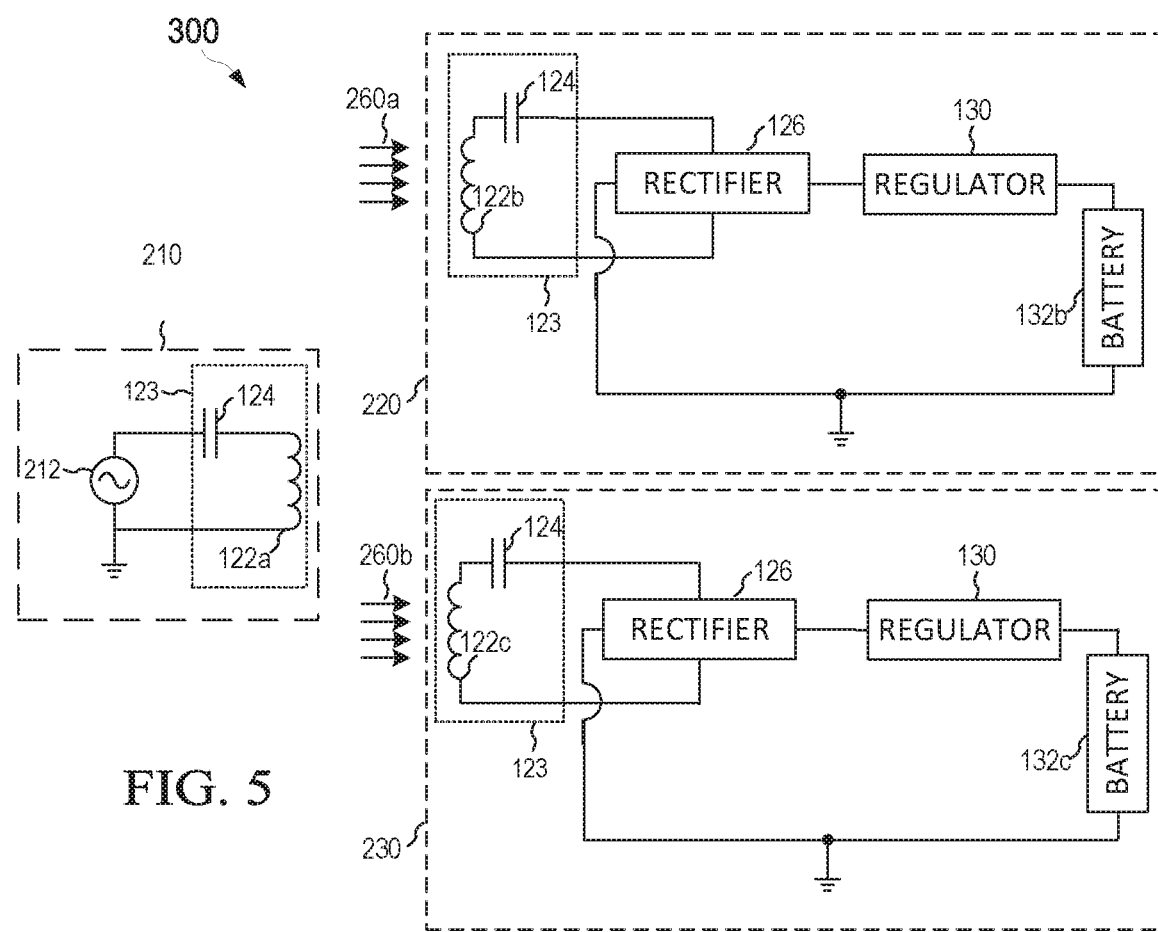
FIG. 5 is a schematic diagram of the embodiment wireless power system operating in a second mode.

FIG. 5 illustrates a schematic diagram of a wireless power system 300, corresponding to the reverse chargeable device 210 operating in transmit mode. The reverse chargeable device 210 wirelessly transfers power 260a-b to each of the first receiving device 220 and the second receiving device 230. In contrast to the reverse chargeable device 210, the first receiving device 220 and the second receiving device 230 are operating in receive mode. As previously noted, the receiving device 225 in FIG. 4C may represent one or both of the first receiving device 220 and the second receiving device 230.

The power source 212 in the reverse chargeable device 210 generates an alternating current (AC) at the coil 122a, which induces a magnetic field at the coil 122b-c. The induced magnetic field induces an AC voltage at the coil 122b-c through mutual coupling. The rectifier 126 converts the AC voltage to a DC voltage. The regulator 130 converts the DC voltage to match a desired DC voltage for the battery 132b-c.

In embodiments, the power source 212 provides the alternating current at the coil 122a using the energy stored in, for example, the battery 132a. In other embodiments, the power source 212 may be provided by an external source to the reverse chargeable device 210.

Figure 6A:
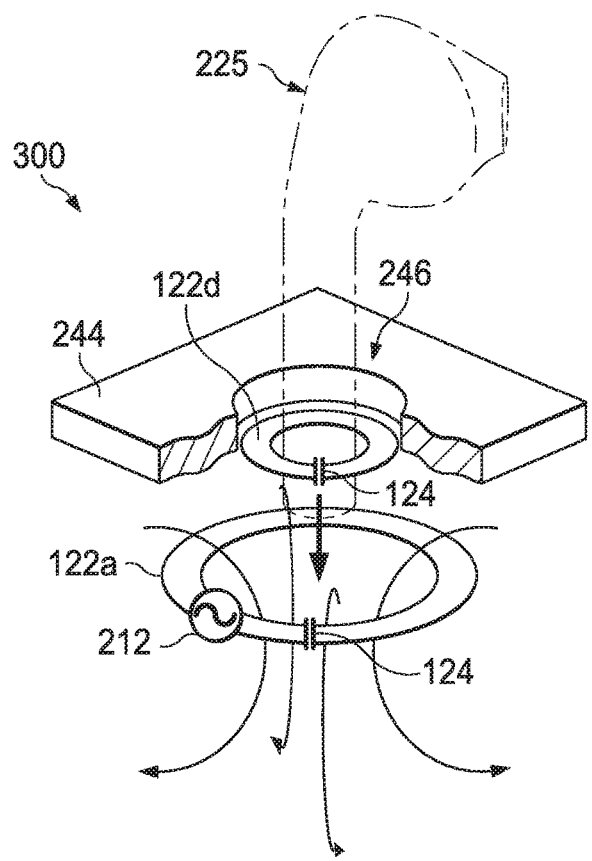
FIGS. 6A-B are graphical representations of electromagnetic fields in the embodiment wireless power system operating in the second mode.
Figure 6B:
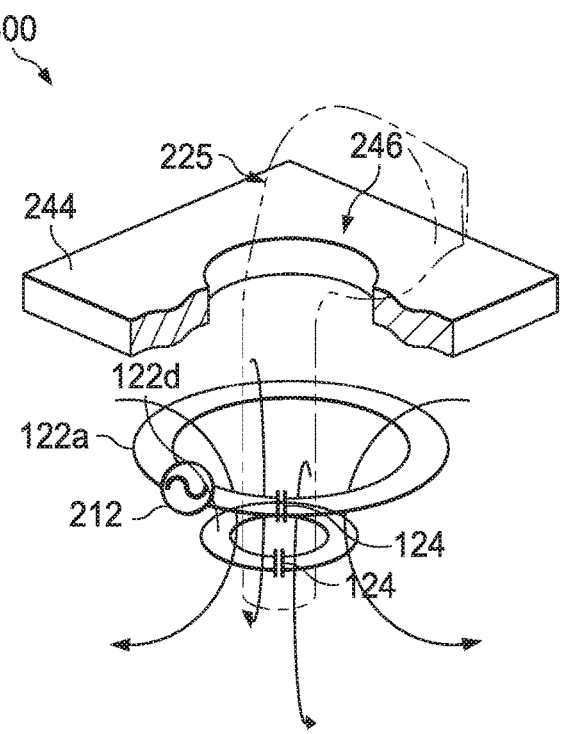

FIGS. 6A-B illustrate representations of magnetic fields in the embodiment wireless power system 300, corresponding to the reverse chargeable device 210 operating in transmit mode and the receiving device 225 operating in receive mode. To simplify the discussion and to minimize confusion, only the coil 122a, capacitor 124, and power source 212 of the reverse chargeable device 210, the coil 122d and capacitor 124 of a receiving device 225 are shown in FIGS. 6A-B.

FIG. 6A illustrates the positioning of the magnetic fields and various power circuits within the wireless power system 200 as the wireless earbud 225 is entering into the gap 246 within the second plate 244. FIG. 6B illustrates the positioning of the wireless earbud 225 in its final position in reference to the reverse chargeable device 210.

As previously discussed regarding FIGS. 4A-B, the second plate 244 that provides the passive magnetic shielding in the reverse chargeable device 210 is broken to include a gap 246, through which the receiving device 225 is inserted. As previously noted, the receiving device 225 may correspond to either one of the first receiving device 220 or the second receiving device 230. In embodiments, the gap 246 may be large enough to hold both devices simultaneously. In other embodiments, the second plate 244 may include additional openings in addition to the gap 246, and each opening may contain one or more receiving devices.

The power source 212 of the reverse chargeable device 210 provides a flow of current through the coil 122a, which generates a magnetic flux. In response to the magnetic flux and the placement of the receiving device 225 in the gap 246, a voltage is induced at the coil 122d, which induces an AC voltage through mutual coupling. The corresponding rectifier 126 converts the AC voltage to a DC voltage, and the corresponding regulator 130 converts the DC voltage from the rectifier 126 to match a desired DC voltage at the battery 132. The power transferred 260a-b from the reverse chargeable device 210 is, thus, stored at a respective battery 132 of the receiving device 225.

Advantageously, the embodiment of FIGS. 3, 4A-C, 5, and 6A-B allow the receiving device 225 to be wirelessly charged within the enclosure and receptacle provided by the reverse chargeable device 210. In contrast with existing devices, the receiving device 225 no longer necessitates the inclusion of interconnect pads for charging. Further, the receiving device 225 is, effectively, being directly charged, simultaneously with the reverse chargeable device 210, from the inductive power originating from the transmitting device 110 in the first mode.

As briefly discussed in regards to FIGS. 6A-B, the coil 122a and the coil 122d are physically disconnected. The reverse chargeable device 210 generates a flow of current through the coil 122, which generates a magnetic flux. The magnetic flux only partially penetrates the coil 122d. In embodiments, as illustrated in FIGS. 6A-B, an absence of passive shielding from, for example, the first plate 242 may expose the surrounding environment to unintentional radiation originating from the reverse chargeable device 210. System and methods to attenuate and block the electromagnetic field are, thus, desired. In addition to passive shielding previously discussed, active shielding and resonant reactive current shielding are some other techniques that may be used to limit and mitigate the electromagnetic field leakage.

Figure 7A:
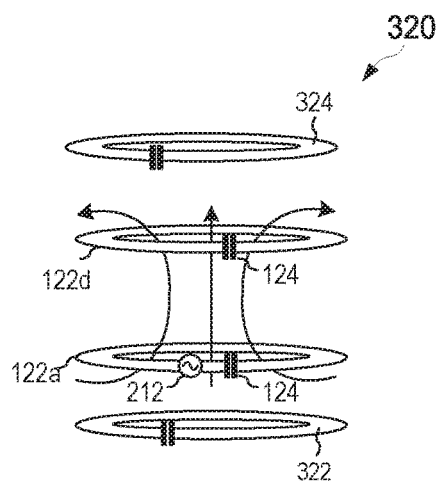
FIG. 7A is a graphical representation of electromagnetic fields using a resonant reactive current (RRC) shielding technique.
Figure 7B:
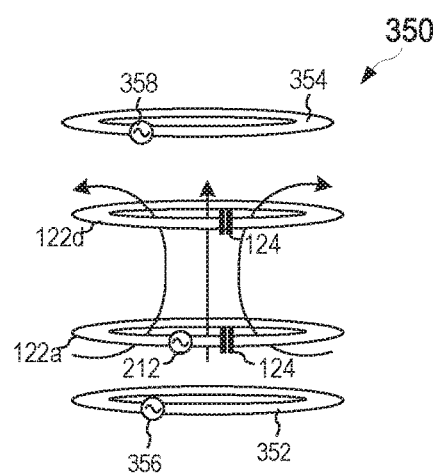
FIG. 7B is a graphical representation of electromagnetic fields using an active shielding technique.

FIGS. 7A-B illustrate graphical representations of electromagnetic fields and shielding techniques, as may be implemented in the wireless power system 300 to minimize unintentional radiation by the reverse chargeable device 210. FIG. 7A illustrates a resonant reactive current (RRC) shielding technique, and FIG. 7B illustrates an active shielding technique. It is noted that the shielding techniques illustrated in FIGS. 7A-B are non-limiting, and other types of shielding are contemplated. To simplify the discussion and to minimize confusion, only the coil 122a, capacitor 124, and power source 212 of the reverse chargeable device 210 and the coil 122d and capacitor 124 of a receiving device 225 are shown in FIGS. 7A and 7B.

FIG. 7A illustrates a resonant reactive current (RRC) shielding technique to limit electromagnetic field leakage. RRC shielding takes advantage of Lenz's law, which states that the direction of current flow induced in a conductor by a changing magnetic field is such that the magnetic field created by the induced current opposes the first changing magnetic field.

The reverse chargeable device 210, for example, may include a first shielding coil 322 and a second shielding coil 324 housed in the body of the reverse chargeable device 210. The shielding coils may be arranged such that the coil 122a and 122d are positioned between the first shielding coil 322 and the second shielding coil 324.

In embodiments, the magnetic field produced by the coil 122a and coil 122d couple with, respectively, the first shielding coil 322 and the second shielding coil 324, and a respective current is induced in the corresponding shielding coil, which generates a canceling magnetic field. The canceling of the magnetic field, in effect, limits the unintentional electromagnetic leakage from the reverse chargeable device 210.

FIG. 7B illustrates an active shielding technique to mitigate electromagnetic field leakage. The reverse chargeable device 210, for example, may include a first shielding coil 352 and a second shielding coil 354 housed in the body of the reverse chargeable device 210. The shielding coils may be arranged such that the coil 122a and 122d are arranged between the first shielding coil 352 and the second shielding coil 354.

Each shielding coil is powered using a power source 356 and 358 that is electrically coupled to the respective shielding coil. In embodiments, the power source 356 and 358 may be the same as the power source 212. In other embodiments, the power source 356 and 358 may be a different power source (not shown) from the power source 212. In embodiments, the power source 356 and 358 is the same as the battery 132. In other embodiments, the power source 356 and 358 is a different source of power (not shown) and separate from the battery 132.

The direction of the current flow in the first shielding coil 352 and the second shielding coil 354 is inverted from the direction of the current flow in the nearest coil. In other words, the direction of the current flow in the first shielding coil 352 is in the opposite direction from the direction of the current flow in the coil 122a. Similarly, the direction of the current flow in the second shielding coil 354 is in the opposite direction from the direction of the current flow in the coil 122d. For example, if the direction of the current flow in the coil 122 is clockwise, the direction of the current flow in the first shielding coil 352 is counter-clockwise, and vice versa. The resulting configuration provides a counter electromagnetic field and effectively cancels the electromagnetic field generated by the reverse chargeable device 210.

In some embodiments, the shielding coils in each of the FIGS. 7A and 7B may be controllable using, for example, a respective processor of the reverse chargeable device 210. For example, the active shield in FIG. 7B may be selectively turned on and off (i.e., the respective power source at each shield enabled or disabled) based on a signal received by a processor to active or deactivate the magnetic shield. In some embodiments, the processor may detect the receiving device 225 within the gap 246 and the absence of an external electromagnetic field. In response, the reverse chargeable device 210 may configure the active shielding or RRC shielding to active or deactivate.

In an embodiment, the determination may be based on a mechanical lever that is activated by the placement of the receiving device within the receptacle of the reverse chargeable device 210. The lever may transition between a first state in the absence of the receiving device 225 and a second state in the presence of the receiving device 225.

In embodiments, the wireless power system 300 is configured to operate within a standard wireless protocol, for example, the Qi wireless standard. In such embodiments, the processor in the reverse chargeable device 210 may be configured to communicate with the transmitting device 110 to determine whether the transmitting device is providing wireless energy. In other embodiments, the processor in the reverse chargeable device 210 may be configured to detect the presence of an external electromagnetic field using, for example, the coil 122 and determining that the resulting AC voltage at the output of the rectifier or regulator is below a threshold.

In another embodiment, the determination that the receiving device 225 is positioned within the gap 246 may be based on, for example, an electrical signal or communication between the receiving device 225 and the reverse chargeable device 210. In other embodiments, the determination may be based on using signals from sensors configured to detect the presence or absence of an object within the receptacle of the reverse chargeable device 210.

It should be appreciated that additional or a combination of the active, passive, or RRC shielding coils may be used at different angles and locations in the reverse chargeable device 210 to minimize electromagnetic field leakage.

In embodiments, the shielding coils in each of the FIGS. 7A and 7B may have a first configuration corresponding to the reverse chargeable device 210 being in transmit mode and a second configuration corresponding to the reverse chargeable device 210 being in receive mode. The reverse chargeable device 210 may transition between the two configurations autonomously (i.e., in response to a change in operating mode) or mechanically by the user.

For example, the shielding coil may be a flexible coil that is enabled (extends along the surface of the housing) or disabled (curled and situated in a small portion of the housing). In another example, the shielding coil may transition between the two configurations in response to, for example, the detecting of the receiving device 225 within the gap 246 and an absence of the transmitting device 110.

In another example, the shielding coil may transition between the two configurations in response to the placement of the receiving device 225 within the gap and, for example, a rotation of the enclosure to unwind the shielding coil and activate the magnetic shield.

Figure 8:
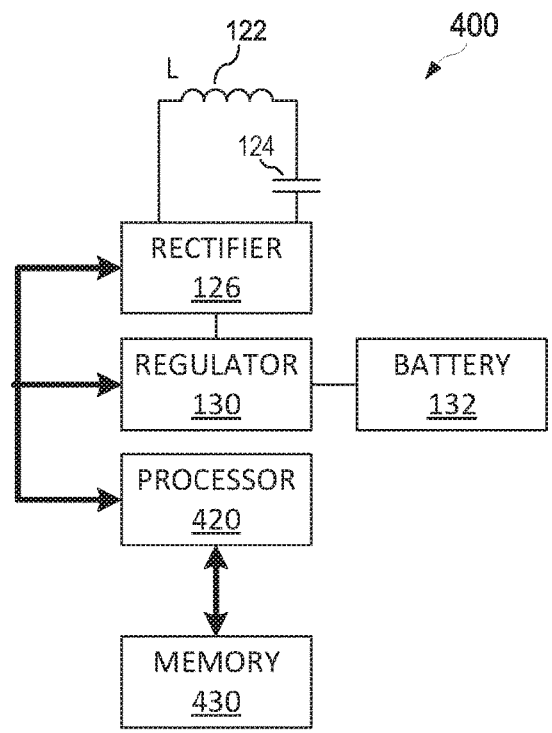
FIG. 8 is a simplified block diagram of a wireless power circuit.

FIG. 8 illustrates a simplified block diagram of a wireless power circuit 400 that may be implemented in the reverse chargeable device 210 or the receiving device 225. The receiving device 225 may represent one or both of the first receiving device 220 and the second receiving device 230.

In addition to the electrical components previously discussed, the wireless power circuit 400 includes a processor 420 and a memory 430, which may (or may not) be arranged as shown. The wireless power circuit 400 may optionally include one or more antenna elements, drivers, demodulators, modulators, filter circuits, and impedance matching circuits (not shown).

It is noted that each of the reverse chargeable device 210 and the receiving device 225 include additional components to the wireless power circuit 400. For example, the receiving device 225 may include other components, such as a dynamic driving unit, magnet control components, coils, microphones, and dampers.

In embodiments, the rectifier 126 of the receiving device 225 may be a passive rectifier, such as a simple diode bridge. In an exemplary embodiment, the receiving device 225 is a wireless earbud. In such an example, the overall size of the receiving device 225 provides limitations to the charge capacity (e.g., 100 milliamp-hour) in the respective battery 132 of the wireless earbud, and thus a simple passive rectifier is sufficient for the purposes of rectification.

In embodiments, the rectifier 126 for the reverse chargeable device 120 may include active FET switches. In such an embodiment, the reverse chargeable device 120 is capable of operating in the transmit mode (i.e., providing wireless energy) by operating in reverse (i.e., inverter mode).

The processor 420 is electrically coupled to the rectifier 126, the regulator 130, and the memory 430. The processor 420 can be, for example, a microprocessor, a microcontroller, a digital signal processor, a field-programmable gate array (FPGA), or an application-specific integrated circuit (ASIC). The wireless power circuit 400 is shown to have a single processor; however, in some embodiments, multiple processors may be included, and the various functions herein attributed to the processor 420 may be distributed across these multiple processors. Further, in some embodiments, the processor 420 may be a processor shared between various circuits of the reverse chargeable device 210 or the receiving device 225.

In embodiments, the processor 420 is configured to execute instructions stored in the memory 430 to switch the operation of the reverse chargeable device 210 from transmit mode to receive mode. In some embodiments, the processor 420 is configured to activate the shielding coil in FIGS. 7A-B in response to the detecting of the receiving device 225 in the gap 246 and detecting an absence of an electromagnetic field generated, for example, by the transmitting device 110. In other embodiments, the processor 420 may be configured to generate a signal that is communicated between the reverse chargeable device and the receiving device 225 to indicate the presence of the receiving device 225 in a receptacle of the reverse chargeable device 210.

The memory 430 may be configured to store data, programs, firmware, operating systems, and other information and to make the data, programs, firmware, operating systems, and additional information accessible to the processor 420. The memory 430 may include any type of non-transitory system memory such as static random access memory (SRAM), dynamic random access memory (DRAM), synchronous DRAM (SDRAM), read-only memory (ROM), or a combination thereof. In an embodiment, the memory 430 may include ROM for use at boot-up, and DRAM for program, firmware, and data storage for use while executing programs. The memory 430 may include, for example, one or more of a solid-state drive, hard disk drive, a magnetic disk drive, a removable memory drive, or an optical disk drive.

Figure 9:
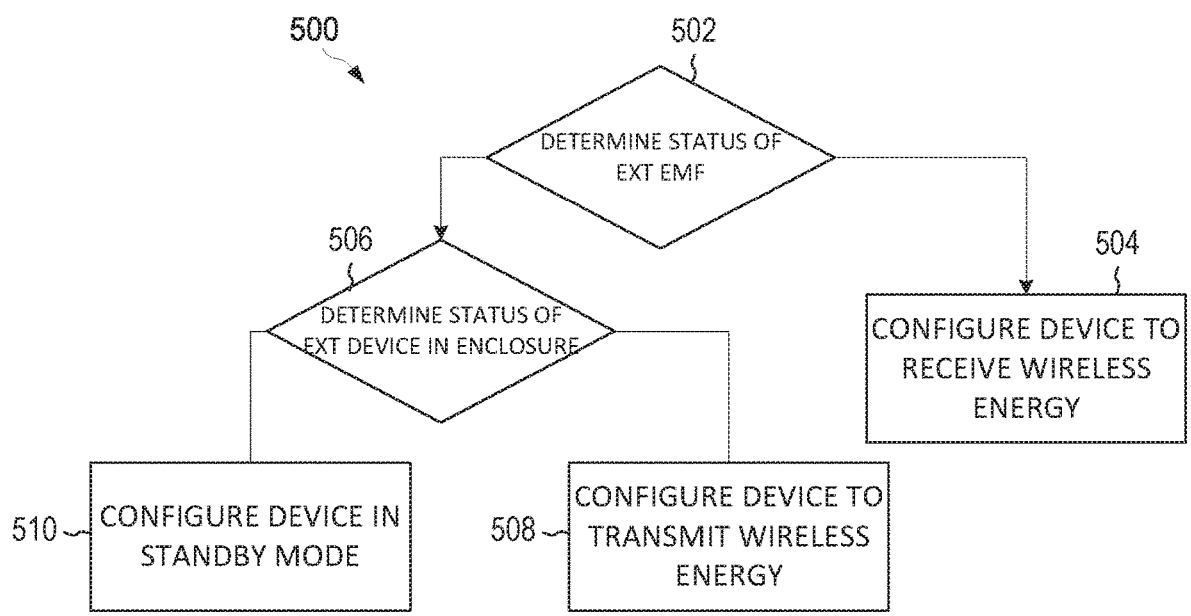
FIG. 9 is a flowchart of an embodiment method of operating the embodiment wireless power system, as may be performed by a reverse chargeable device.

FIG. 9 illustrates a flowchart of an embodiment method 500 for operating the wireless power system 300, as may be performed by the reverse chargeable device 210. At step 502, the processor 420 of the reverse chargeable device 210 detects the status of an external electromagnetic field. In embodiments, the external electromagnetic field may be originating from the transmitting device 110. In embodiments, the processor 420 determines the presence or absence of the electromagnetic field by, for example, determining whether the output voltage of the rectifier 126 or regulator 130 is within a threshold voltage.

In other embodiments, the reverse chargeable device 210 may detect a communication, for example, a near field communication (NFC) from the transmitting device 110 that signals the transmission of the wireless energy. In such embodiments, the method may transition back to step 502 and then to step 506.

In some embodiments, the reverse chargeable device 210 may receive a communication, for example, a near field communication from the receiving device 225 that signals an absence of an electromagnetic field. In such embodiments, the method may transition back to step 502 and then to step 506.

At step 504, in response to detecting an external electromagnetic field, the reverse chargeable device 210 configures the wireless power circuit 400 to operate in receive mode. In this configuration, the battery 132 of the reverse chargeable device 210 is in charge mode. In embodiments, the reverse chargeable device 210 may determine the presence of the electromagnetic field by the external device, and in response, may communicate with the external device to disable the transmission of the wireless energy, for example, using near field communication.

At step 506, in response to detecting an absence of an external electromagnetic field, the reverse chargeable device 210 determines whether an external device (i.e., the receiving device 225) is placed within the receptacle of the reverse chargeable device 210. As previously noted, the determination may be in response to, for example, a mechanical configuration such as a change in a position of a lever, in response to a detection by the sensor, or in response to a near field communication between the receiving device 225 and the reverse chargeable device 210.

At step 508, in response to detecting the absence of the external electromagnetic field and the presence of the receiving device 225, the reverse chargeable device 210 configures the wireless power circuit 400 to operate in transmit mode. In this configuration, the power source 212 provides wireless energy to the receiving device 225.

At step 510, in response to detecting the absence of the external electromagnetic field and the absence of the receiving device 225, the reverse chargeable device 210 configures the wireless power circuit 400 to operate in standby mode. In embodiments, the reverse chargeable device 210 is not configured in either transmit or receive mode. In other embodiments, the reverse chargeable device 210 may be configured to be in receive mode.

It is noted that the order of steps shown in FIG. 9 is not absolutely required, so in principle, the various steps may be performed out of the illustrated order. Also, certain steps may be skipped, different steps may be added or substituted, or selected steps or groups of steps may be performed in a separate application.

Figure 10:
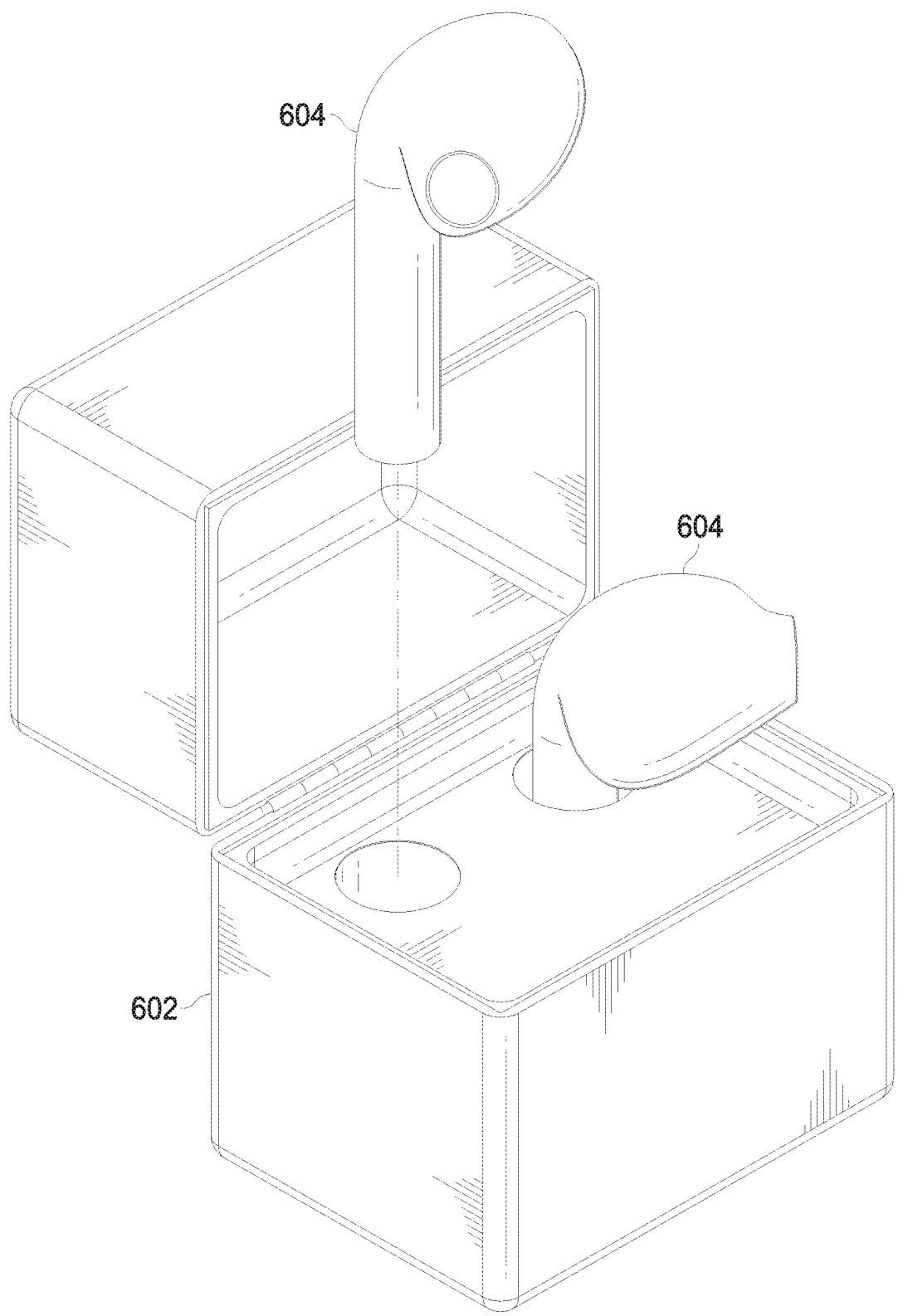
FIG. 10 is an illustration of an embodiment enclosure and wireless earbuds.

FIG. 10 illustrates a representation of an embodiment enclosure 602 and a pair of wireless earbuds 604, as may be represented, respectively, by the reverse chargeable device 210 and the receiving device 225. As shown, the wireless earbuds 604 are capable of receiving wireless power, due to the configuration of the enclosure 602. The configuration allows the enclosure 602 and the wireless earbuds 604 to be simultaneously wirelessly charged. Further, the configuration enables the wireless earbuds 604 to be wirelessly charged by the enclosure 602 when the source of power for the wireless charging originates from the enclosure 602.

The inventive aspects of this disclosure are readily compatible with the Qi wireless interface standard. It should also be appreciated, however, that these inventive aspects may also be applicable to any other type of reverse wireless charging having different resonant and operating frequencies, which are designed for compatibility with other wireless standards. Thus, the embodiments of the present invention may operate without complying with the Qi standard.

In the present description, when reference is made to terms qualifying absolute positions, such as terms "front," "back," "top," "bottom," "left," "right," etc., or relative positions, such as terms "above," "under," "upper," "lower," etc., or to terms qualifying directions, such as terms "horizontal," "vertical," etc., it is referred to the orientation of the drawings.

Unless otherwise specified, when reference is made to two elements electrically connected together, this means that the elements are directly connected with no intermediate element other than conductors. When reference is made to two elements electrically coupled together, this means that the two elements may be directly coupled (connected) or coupled via one or a plurality of other elements.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A wireless power system comprising:
    an enclosure, comprising:
        a housing having:
            a receptacle for holding a receiving device, and
            a plate having a gap, the plate configured to shield electromagnetic fields, and
        a first circuit configured to:
            receive wireless energy in a first mode corresponding to a first electromagnetic field generated by an external device, and
            transmit wireless energy in a second mode corresponding to a second electromagnetic field generated by the first circuit; and
    the receiving device, comprising:
        a body configured to shield electromagnetic fields,
        a coil surrounding the body, and
        a second circuit configured to receive wireless energy in accordance with the first electromagnetic field and the second electromagnetic field, the receiving in response to a placement of the receiving device in the gap of the plate.

2. The wireless power system of claim 1, wherein the enclosure housing further comprises a resonant reactive current shielding, the resonant reactive current shielding having a shield coil configured to reduce electromagnetic leakage from the enclosure housing.

3. The wireless power system of claim 1, wherein the enclosure housing further comprises an active shielding having a shield coil and a power source coupled to the shield coil, the power source configured to be enabled in the second mode of the first circuit and disabled in the first mode of the first circuit, enabling of the active shielding reducing electromagnetic leakage from the enclosure housing.

4. The wireless power system of claim 1, wherein the first circuit further comprises:
    a non-transitory memory storage comprising instructions; and
    a processor in communication with the non-transitory memory storage, wherein the processor executes the instructions to:
        detect an absence of the first electromagnetic field;
        detect the placement of the receiving device in the gap of the plate; and
        generate the second electromagnetic field.

5. The wireless power system of claim 4, wherein the first circuit further comprises a rectifier electrically coupled to a second coil, wherein detecting an absence of the first electromagnetic field comprises determining whether a voltage at an output of the rectifier is within a threshold, and, based thereon, detecting a status of the first electromagnetic field.

6. The wireless power system of claim 4, wherein detecting the placement of the receiving device in the gap of the plate comprises receiving a signal from the receiving device, the signal indicating a request for wireless energy.

7. The wireless power system of claim 1, wherein the enclosure, the receiving device, and the external device are in communication with each other using near field communication.

8. A method for operating a wireless power system comprising an enclosure and a receiving device, the method comprising:
    placing the receiving device within a respectable of a housing of the enclosure;
    shielding electromagnetic fields by a plate of the enclosure, the plate having a gap;
    receiving, by a first circuit, wireless energy in a first mode corresponding to a first electromagnetic field generated by an external device;
    transmitting, by the first circuit, wireless energy in a second mode corresponding to a second electromagnetic field generated by the first circuit;
    shielding electromagnetic fields by a body of the receiving device, a coil surrounding the body of the receiving device; and
    receiving wireless energy by a second circuit of the receiving device in accordance with the first electromagnetic field and the second electromagnetic field, the receiving in response to a placement of the receiving device in the gap of the plate.

9. The method of claim 8, wherein the housing of the enclosure further comprises a resonant reactive current shielding having a shield coil, the method further comprising reducing electromagnetic leakage from the housing of the enclosure using the shield coil.

10. The method of claim 8, wherein the housing of the enclosure comprises an active shielding having a shield coil and a power source coupled to the shield coil, the method further comprising:
    enabling the power source in the second mode;
    disabling the power source in the first mode; and
    enabling the active shielding to reduce electromagnetic leakage from the housing of the enclosure.

11. The method of claim 8, further comprising generating the second electromagnetic field in response to detecting an absence of the first electromagnetic field and a placement of the receiving device in the gap of the plate.

12. The method of claim 11, wherein the first circuit further comprises a rectifier electrically coupled to a second coil, the method further comprising determining that a voltage at an output of the rectifier is within a threshold, and, based thereon, detecting the absence of the first electromagnetic field.

13. The method of claim 11, further comprising receiving a signal from the receiving device indicating a request for wireless energy, and, based thereon, detecting the placement of the receiving device in the gap of the plate.

14. The method of claim 8, further comprising communicating between the enclosure, the receiving device, and the external device using near field communication.

15. A wireless power system, comprising:
an enclosure having a housing and a first circuit, the first circuit comprising;
  a non-transitory memory storage comprising instructions; and
  a processor in communication with the non-transitory memory storage, wherein the instructions when executed by the processor cause the processor to:
    receive wireless energy in a first mode corresponding to a first electromagnetic field generated by an external device, and
    transmit wireless energy in a second mode corresponding to a second electromagnetic field generated by the first circuit; and
a receiving device having a body, a coil surrounding the body, and a second circuit, the body configured to shied electromagnetic fields, the second circuit configured to receive wireless energy in accordance with the first electromagnetic field and the second electromagnetic field, the receiving in response to a placement of the receiving device in the housing.

16. The wireless power system of claim 15, wherein the housing comprises a plate having a gap, the plate configured to shield electromagnetic fields.

17. The wireless power system of claim 15, wherein the housing comprises a receptacle for holding the receiving device.

18. The wireless power system of claim 15, wherein the instructions when executed by the processor cause the first circuit to generate the second electromagnetic field in response to detecting an absence of the first electromagnetic field and a placement of the receiving device in the housing.

19. The wireless power system of claim 15, wherein the housing further comprises an active shielding having a shield coil and a power source coupled to the shield coil, the power source configured to be enabled in the second mode of the first circuit and disabled in the first mode of the first circuit, enabling of the active shielding reducing electromagnetic leakage from the enclosure housing.

20. The wireless power system of claim 15, wherein the first circuit further comprises a rectifier electrically coupled to a second coil, wherein the instructions when executed by the processor cause the first circuit to detect an absence of the first electromagnetic field in response to determining whether a voltage at an output of the rectifier is within a threshold.

* * * * *